US009840042B2

(12) United States Patent
Allard et al.

(10) Patent No.: US 9,840,042 B2
(45) Date of Patent: Dec. 12, 2017

(54) ADHESIVELY SECURED VACUUM INSULATED PANELS FOR REFRIGERATORS

(71) Applicant: WHIRLPOOL CORPORATION, Benton Harbor, MI (US)

(72) Inventors: Paul B. Allard, Coloma, MI (US); Abhay Naik, Stevensville, MI (US); Andrea Olivani, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/978,544

(22) Filed: Dec. 22, 2015

(65) Prior Publication Data

US 2017/0176090 A1 Jun. 22, 2017

(51) Int. Cl.

| | |
|---|---|
| ***B29C 65/00*** | (2006.01) |
| ***B29C 65/50*** | (2006.01) |
| ***F25D 23/02*** | (2006.01) |
| ***B29C 65/54*** | (2006.01) |

(Continued)

(52) U.S. Cl.

CPC ............ *B29C 65/50* (2013.01); *B29C 65/485* (2013.01); *B29C 65/4815* (2013.01); *B29C 65/4855* (2013.01); *B29C 65/542* (2013.01); *B29C 66/0222* (2013.01); *B29C 66/73113* (2013.01); *F25D 23/028* (2013.01); *B29L 2031/7622* (2013.01)

(58) Field of Classification Search

CPC ........ F25D 23/02; F25D 23/028; F25D 23/06; F25D 23/063; F25D 23/065; F25D 23/066; F25D 23/062; F25D 23/064; B29C 65/542; B29C 65/50

USPC .................................. 156/305; 312/401, 406

See application file for complete search history.

(56) References Cited

U.S. PATENT DOCUMENTS

| | | | |
|---|---|---|---|
| 948,541 | A | 2/1910 | Coleman |
| 1,275,511 | A | 8/1918 | Welch |
| 1,849,369 | A | 3/1932 | Frost |

(Continued)

FOREIGN PATENT DOCUMENTS

| | | |
|---|---|---|
| CA | 1320631 | 7/1993 |
| CA | 2259665 A1 | 1/1998 |

(Continued)

OTHER PUBLICATIONS

BASF, "Balindur™ Solutions for fixing Vaccum Insulated Panels," web page, 4 pages, date unknown, http://performance-materials.basf.us/products/view/family/balindur.

(Continued)

*Primary Examiner* — John Goff
(74) *Attorney, Agent, or Firm* — Price Heneveld LLP

(57) ABSTRACT

A method of making a cabinet for refrigerators and the like. The method includes forming a liner and a wrapper. The method further includes providing a vacuum insulated core that includes a filler material disposed inside a substantially impermeable envelope that is evacuated to form a vacuum inside of the envelope. The vacuum insulated core includes a first wall and a second wall extending transversely relative to the first wall. The core is adhesively secured to the wrapper, and the liner is adhesively secured to the core. The wrapper and the liner are sealed together at the peripheries thereof.

9 Claims, 6 Drawing Sheets

(51) Int. Cl.
*B29C 65/48* (2006.01)
*B29L 31/00* (2006.01)

(56) References Cited

U.S. PATENT DOCUMENTS 2,108,212 A 2/1938 Schellens
2,128,336 A 8/1938 Torstensson
2,164,143 A 6/1939 Munters
2,318,744 A 5/1943 Brown
2,356,827 A 8/1944 Coss et al.
2,432,042 A 12/1947 Richard
2,439,602 A 4/1948 Heritage
2,439,603 A 4/1948 Heritage
2,538,780 A 1/1951 Hazard
2,559,356 A 7/1951 Hedges
2,729,863 A 1/1956 Kurtz
2,768,046 A 10/1956 Evans
2,817,123 A 12/1957 Jacobs
2,942,438 A 6/1960 Schmeling
2,985,075 A 5/1961 Knutsson-Hall
3,086,830 A 4/1963 Malia
3,125,388 A 3/1964 Costantini et al.
3,137,900 A 6/1964 Carbary
3,218,111 A 11/1965 Steiner
3,258,883 A 7/1966 Campanaro et al.
3,358,059 A 12/1967 Snyder
3,379,481 A 4/1968 Fisher
3,408,316 A 10/1968 Mueller et al.
3,471,416 A * 10/1969 Fijal ....................... C08G 18/18 521/115
3,597,850 A 8/1971 Jenkins
3,635,536 A 1/1972 Lackey et al.
3,688,384 A 9/1972 Mizushima et al.
3,868,829 A 3/1975 Mann et al.
3,875,683 A 4/1975 Waters
4,006,947 A 2/1977 Haag et al.
4,043,624 A 8/1977 Lindenschmidt
4,050,145 A 9/1977 Benford
4,067,628 A 1/1978 Sherburn
4,242,241 A 12/1980 Rosen et al.
4,303,732 A 12/1981 Torobin
4,325,734 A 4/1982 Burrage et al.
4,332,429 A 6/1982 Frick et al.
4,396,362 A 8/1983 Thompson et al.
4,417,382 A 11/1983 Schilf
4,492,368 A * 1/1985 DeLeeuw ............ B29C 33/202 269/235
4,529,368 A 7/1985 Makansi
4,548,196 A 10/1985 Torobin
4,660,271 A 4/1987 Lenhardt
4,671,909 A 6/1987 Torobin
4,671,985 A 6/1987 Rodrigues et al.
4,745,015 A 5/1988 Cheng et al.
4,777,154 A 10/1988 Torobin
4,805,293 A 2/1989 Buchser
4,917,841 A 4/1990 Jenkins
5,007,226 A 4/1991 Nelson
5,018,328 A 5/1991 Cur et al.
5,033,636 A 7/1991 Jenkins
5,066,437 A 11/1991 Barito et al.
5,082,335 A 1/1992 Cur et al.
5,094,899 A 3/1992 Rusek, Jr.
5,118,174 A 6/1992 Benford et al.
5,157,893 A 10/1992 Benson et al.
5,168,674 A 12/1992 Molthen
5,175,975 A 1/1993 Benson et al.
5,212,143 A 5/1993 Torobin
5,221,136 A 6/1993 Hauck et al.
5,231,811 A * 8/1993 Andrepont .............. B32B 13/04 220/565
5,248,196 A 9/1993 Lynn et al.
5,252,408 A 10/1993 Bridges et al.
5,263,773 A 11/1993 Gable et al.
5,273,801 A 12/1993 Barry et al.
5,318,108 A 6/1994 Benson et al.
5,340,208 A 8/1994 Hauck et al.
5,353,868 A 10/1994 Abbott
5,359,795 A 11/1994 Mawby et al.
5,375,428 A 12/1994 LeClear et al.
5,397,759 A 3/1995 Torobin
5,418,055 A 5/1995 Chen et al.
5,433,056 A 7/1995 Benson et al.
5,477,676 A 12/1995 Benson et al.
5,500,305 A 3/1996 Bridges et al.
5,505,810 A 4/1996 Kirby et al.
5,507,999 A 4/1996 Copsey et al.
5,509,248 A 4/1996 Dellby et al.
5,512,345 A 4/1996 Tsusumi et al.
5,532,034 A 7/1996 Kirby et al.
5,562,154 A 10/1996 Benson et al.
5,586,680 A 12/1996 Dellby et al.
5,632,543 A 5/1997 McGrath et al.
5,640,828 A 6/1997 Reeves et al.
5,643,485 A 7/1997 Potter et al.
5,652,039 A 7/1997 Tremain et al.
5,716,581 A 2/1998 Tirell et al.
5,792,801 A 8/1998 Tsuda et al.
5,813,454 A 9/1998 Potter
5,827,385 A 10/1998 Meyer et al.
5,843,353 A 12/1998 DeVos et al.
5,866,228 A 2/1999 Awata
5,868,890 A 2/1999 Fredrick
5,900,299 A 5/1999 Wynne
5,924,295 A 7/1999 Park
5,952,404 A 9/1999 Simpson et al.
5,966,963 A 10/1999 Kovalaske
5,985,189 A 11/1999 Lynn et al.
6,013,700 A 1/2000 Asano et al.
6,063,471 A 5/2000 Dietrich et al.
6,094,922 A 8/2000 Ziegler
6,109,712 A 8/2000 Haworth et al.
6,128,914 A 10/2000 Tamaoki et al.
6,132,837 A 10/2000 Boes et al.
6,158,233 A 12/2000 Cohen et al.
6,163,976 A 12/2000 Tada et al.
6,164,030 A 12/2000 Dietrich
6,187,256 B1 2/2001 Aslan et al.
6,209,342 B1 4/2001 Banicevic et al.
6,210,625 B1 4/2001 Matsushita et al.
6,220,473 B1 4/2001 Lehman et al.
6,221,456 B1 4/2001 Pogorski et al.
6,224,179 B1 5/2001 Wenning et al.
6,244,458 B1 6/2001 Frysinger et al.
6,260,377 B1 7/2001 Tamaoki et al.
6,294,595 B1 9/2001 Tyagi et al.
6,305,768 B1 10/2001 Nishimoto
6,390,378 B1 5/2002 Briscoe, Jr. et al.
6,406,449 B1 6/2002 Moore et al.
6,408,841 B1 6/2002 Hirath et al.
6,415,623 B1 7/2002 Jennings et al.
6,460,955 B1 10/2002 Vaughan et al.
6,623,413 B1 9/2003 Wynne
6,716,501 B2 4/2004 Kovalchuk et al.
6,736,472 B2 5/2004 Banicevic
6,749,780 B2 6/2004 Tobias
6,773,082 B2 8/2004 Lee
6,858,280 B2 2/2005 Allen et al.
6,860,082 B1 3/2005 Yamamoto et al.
6,938,968 B2 9/2005 Tanimoto et al.
7,026,054 B2 4/2006 Ikegawa et al.
7,210,308 B2 5/2007 Tanimoto et al.
7,234,247 B2 6/2007 Maguire
7,284,390 B2 10/2007 Van Meter et al.
7,296,432 B2 11/2007 Muller et al.
7,316,125 B2 1/2008 Uekado et al.
7,343,757 B2 3/2008 Egan et al.
7,449,227 B2 11/2008 Echigoya et al.
7,475,562 B2 1/2009 Jackovin
7,614,244 B2 11/2009 Venkatakrishnan et al.
7,625,622 B2 12/2009 Teckoe et al.
7,641,298 B2 1/2010 Hirath et al.
7,703,217 B2 4/2010 Tada et al.
7,762,634 B2 7/2010 Tenra et al.
7,794,805 B2 9/2010 Aumaugher et al.

(56) References Cited

U.S. PATENT DOCUMENTS

| | | | |
|---|---|---|---|
| 7,815,269 | B2 | 10/2010 | Wenning et al. |
| 7,842,269 | B2 | 11/2010 | Schachtely et al. |
| 7,861,538 | B2 | 1/2011 | Welle et al. |
| 7,886,559 | B2 | 2/2011 | Hell et al. |
| 7,893,123 | B2 | 2/2011 | Luisi |
| 7,908,873 | B1 | 3/2011 | Cur et al. |
| 7,930,892 | B1 | 4/2011 | Vonderhaar |
| 7,938,148 | B2 | 5/2011 | Carlier et al. |
| 8,113,604 | B2 | 2/2012 | Olson et al. |
| 8,117,865 | B2 | 2/2012 | Allard et al. |
| 8,163,080 | B2 | 4/2012 | Meyer et al. |
| 8,176,746 | B2 | 5/2012 | Allard et al. |
| 8,202,599 | B2 | 6/2012 | Henn |
| 8,211,523 | B2 | 7/2012 | Fujimori et al. |
| 8,266,923 | B2 | 9/2012 | Bauer et al. |
| 8,281,558 | B2 | 10/2012 | Heimeyer et al. |
| 8,343,395 | B2 | 1/2013 | Hu et al. |
| 8,353,177 | B2 | 1/2013 | Adamski et al. |
| 8,456,040 | B2 | 6/2013 | Allard et al. |
| 8,528,284 | B2 | 9/2013 | Aspenson et al. |
| 8,739,568 | B2 | 6/2014 | Allard et al. |
| 8,752,918 | B2 | 6/2014 | Kang |
| 8,770,682 | B2 | 7/2014 | Lee et al. |
| 8,776,390 | B2 | 7/2014 | Hanaoka et al. |
| 8,852,708 | B2 | 10/2014 | Kim et al. |
| 8,881,398 | B2 | 11/2014 | Hanley et al. |
| RE45,501 | E | 5/2015 | Maguire |
| 9,102,076 | B2 | 8/2015 | Doshi et al. |
| 9,140,480 | B2 | 9/2015 | Kuehl et al. |
| 9,328,951 | B2 | 5/2016 | Shin et al. |
| 9,463,917 | B2 | 10/2016 | Wu et al. |
| 2002/0168496 | A1 | 11/2002 | Morimoto et al. |
| 2003/0008100 | A1 | 1/2003 | Horn |
| 2004/0178707 | A1 | 9/2004 | Avendano |
| 2004/0180176 | A1 | 9/2004 | Rusek |
| 2004/0253406 | A1 | 12/2004 | Hayashi et al. |
| 2005/0235682 | A1* | 10/2005 | Hirai .................... F25D 23/062 62/440 |
| 2006/0076863 | A1 | 4/2006 | Echigoya et al. |
| 2006/0201189 | A1 | 9/2006 | Adamski et al. |
| 2006/0263571 | A1 | 11/2006 | Tsunetsugu et al. |
| 2007/0001563 | A1 | 1/2007 | Park et al. |
| 2007/0099502 | A1 | 5/2007 | Ferinauer |
| 2007/0176526 | A1 | 8/2007 | Gomoll et al. |
| 2007/0266654 | A1 | 11/2007 | Noale |
| 2008/0300356 | A1 | 12/2008 | Meyer et al. |
| 2008/0309210 | A1 | 12/2008 | Luisi et al. |
| 2009/0032541 | A1 | 2/2009 | Rogala et al. |
| 2009/0056367 | A1 | 3/2009 | Neumann |
| 2009/0058244 | A1 | 3/2009 | Cho et al. |
| 2009/0113925 | A1 | 5/2009 | Korkmaz |
| 2009/0179541 | A1 | 7/2009 | Smith et al. |
| 2009/0324871 | A1 | 12/2009 | Henn |
| 2010/0170279 | A1 | 7/2010 | Aoki |
| 2010/0231109 | A1 | 9/2010 | Matzke et al. |
| 2010/0293984 | A1 | 11/2010 | Adamski et al. |
| 2010/0295435 | A1 | 11/2010 | Kendall et al. |
| 2011/0030894 | A1 | 2/2011 | Tenra et al. |
| 2011/0095669 | A1 | 4/2011 | Moon et al. |
| 2011/0146325 | A1 | 6/2011 | Lee |
| 2011/0146335 | A1 | 6/2011 | Jung et al. |
| 2011/0165367 | A1 | 7/2011 | Kojima et al. |
| 2011/0241513 | A1 | 10/2011 | Nomura et al. |
| 2011/0241514 | A1 | 10/2011 | Nomura et al. |
| 2011/0260351 | A1 | 10/2011 | Corradi et al. |
| 2011/0290808 | A1 | 12/2011 | Bai et al. |
| 2011/0315693 | A1 | 12/2011 | Cur et al. |
| 2012/0000234 | A1 | 1/2012 | Adamski et al. |
| 2012/0103006 | A1 | 5/2012 | Jung et al. |
| 2012/0104923 | A1 | 5/2012 | Jung et al. |
| 2012/0118002 | A1 | 5/2012 | Kim et al. |
| 2012/0137501 | A1 | 6/2012 | Allard et al. |
| 2012/0152151 | A1 | 6/2012 | Meyer et al. |
| 2012/0196059 | A1 | 8/2012 | Fujimori et al. |
| 2012/0231204 | A1 | 9/2012 | Jeon et al. |
| 2012/0237715 | A1 | 9/2012 | McCracken |
| 2012/0273111 | A1 | 11/2012 | Nomura et al. |
| 2012/0279247 | A1 | 11/2012 | Katu et al. |
| 2012/0285971 | A1 | 11/2012 | Junge et al. |
| 2012/0297813 | A1* | 11/2012 | Hanley ................ F25D 23/064 62/331 |
| 2012/0324937 | A1 | 12/2012 | Adamski et al. |
| 2013/0033163 | A1 | 2/2013 | Kang |
| 2013/0068990 | A1 | 3/2013 | Eilbracht et al. |
| 2013/0111941 | A1 | 5/2013 | Yu et al. |
| 2013/0255304 | A1 | 10/2013 | Cur et al. |
| 2013/0256318 | A1 | 10/2013 | Kuehl et al. |
| 2013/0256319 | A1 | 10/2013 | Kuehl et al. |
| 2013/0257256 | A1 | 10/2013 | Allard et al. |
| 2013/0257257 | A1 | 10/2013 | Cur et al. |
| 2013/0264439 | A1 | 10/2013 | Allard et al. |
| 2013/0270732 | A1 | 10/2013 | Wu et al. |
| 2013/0305535 | A1 | 11/2013 | Cur et al. |
| 2014/0132144 | A1 | 5/2014 | Kim et al. |
| 2014/0171578 | A1 | 6/2014 | Meyer et al. |
| 2014/0260332 | A1 | 9/2014 | Wu |
| 2014/0346942 | A1 | 11/2014 | Kim et al. |
| 2014/0364527 | A1* | 12/2014 | Wintermantel .... C08G 18/7671 521/174 |
| 2015/0027628 | A1 | 1/2015 | Cravens et al. |
| 2015/0147514 | A1 | 5/2015 | Shinohara et al. |
| 2015/0168050 | A1 | 6/2015 | Cur et al. |
| 2015/0190840 | A1 | 7/2015 | Muto et al. |
| 2016/0240839 | A1 | 8/2016 | Umeyama et al. |
| 2016/0258671 | A1 | 9/2016 | Allard et al. |

FOREIGN PATENT DOCUMENTS

| | | | |
|---|---|---|---|
| CA | 2640006 | A1 | 8/2007 |
| CN | 1158509 | A | 4/2002 |
| CN | 100359272 | A | 12/2005 |
| CN | 1970185 | A | 5/2007 |
| CN | 101437756 | A | 5/2009 |
| CN | 201680116 | U | 12/2010 |
| CN | 102296714 | A | 12/2011 |
| CN | 102452522 | A | 5/2012 |
| CN | 102717578 | A | 10/2012 |
| CN | 102720277 | A | 10/2012 |
| CN | 103072321 | A | 5/2013 |
| CN | 203331442 | U | 12/2013 |
| CN | 104816478 | A | 8/2015 |
| DE | 1150190 | B | 6/1963 |
| DE | 4110292 | A1 | 10/1992 |
| DE | 19818890 | A1 | 11/1999 |
| DE | 19915311 | A1 | 10/2000 |
| DE | 102008026528 | A1 | 12/2009 |
| DE | 102009046810 | A1 | 5/2011 |
| DE | 102010024951 | A1 | 12/2011 |
| DE | 102011051178 | A1 | 12/2012 |
| DE | 102012223536 | A1 | 6/2014 |
| DE | 102012223541 | A1 | 6/2014 |
| EP | 0260699 | A2 | 3/1988 |
| EP | 0480451 | A1 | 4/1992 |
| EP | 0691518 | A1 | 1/1996 |
| EP | 0860669 | A1 | 8/1998 |
| EP | 1087186 | A2 | 3/2001 |
| EP | 1200785 | A1 | 5/2002 |
| EP | 1243880 | A1 | 9/2002 |
| EP | 1484563 | A1 | 12/2004 |
| EP | 1496322 | A1 | 1/2005 |
| EP | 1505359 | A1 | 2/2005 |
| EP | 1602425 | A1 | 12/2005 |
| EP | 2342511 | A2 | 7/2011 |
| EP | 2607073 | A2 | 6/2013 |
| EP | 2789951 | A1 | 10/2014 |
| FR | 2991698 | A1 | 12/2013 |
| FR | 2980963 | A1 | 4/2014 |
| GB | 837929 | A | 6/1960 |
| GB | 1214548 | A | 12/1970 |
| JP | 51057777 | | 5/1976 |
| JP | 59191588 | | 12/1984 |
| JP | 03013779 | A | 1/1991 |
| JP | 06159922 | A | 6/1994 |
| JP | 7001479 | | 1/1995 |

(56) References Cited

FOREIGN PATENT DOCUMENTS

| | | | |
|---|---|---|---|
| JP | H07167377 | A | 7/1995 |
| JP | 08300052 | | 11/1996 |
| JP | H08303686 | A | 11/1996 |
| JP | H09166271 | A | 6/1997 |
| JP | 10113983 | | 5/1998 |
| JP | 11311395 | | 11/1999 |
| JP | 11336990 | | 12/1999 |
| JP | 2000097390 | | 4/2000 |
| JP | 2000117334 | A | 4/2000 |
| JP | 2001038188 | A | 2/2001 |
| JP | 2001116437 | A | 4/2001 |
| JP | 03478771 | | 6/2001 |
| JP | 2001336691 | A | 12/2001 |
| JP | 2001343176 | | 12/2001 |
| JP | 2004303695 | | 10/2004 |
| JP | 2005114015 | A | 4/2005 |
| JP | 2005164193 | | 6/2005 |
| JP | 2005256849 | A | 9/2005 |
| JP | 2006077792 | A | 3/2006 |
| JP | 2006161945 | A | 6/2006 |
| JP | 03792801 | B2 | 7/2006 |
| JP | 2006200685 | A | 8/2006 |
| JP | 2007263186 | A | 10/2007 |
| JP | 4111096 | B2 | 7/2008 |
| JP | 2008157431 | A | 7/2008 |
| JP | 2009063064 | A | 3/2009 |
| JP | 2009162402 | A | 7/2009 |
| JP | 2009524570 | A | 7/2009 |
| JP | 2010017437 | A | 1/2010 |
| JP | 2010071565 | A | 4/2010 |
| JP | 2010108199 | A | 5/2010 |
| JP | 2010145002 | A | 7/2010 |
| JP | 04545126 | B2 | 9/2010 |
| JP | 2010236770 | A | 10/2010 |
| JP | 2010276309 | A | 12/2010 |
| JP | 2011002033 | A | 1/2011 |
| JP | 2011069612 | A | 4/2011 |
| JP | 04779684 | B2 | 9/2011 |
| JP | 2011196644 | A | 10/2011 |
| JP | 4828353 | B2 | 11/2011 |
| JP | 2012026493 | A | 2/2012 |
| JP | 2012063029 | A | 2/2012 |
| JP | 04897473 | B2 | 3/2012 |
| JP | 2013195009 | A | 3/2012 |
| JP | 2012087993 | A | 5/2012 |
| JP | 2012163258 | A | 8/2012 |
| JP | 2012189114 | A | 10/2012 |
| JP | 2012242075 | A | 12/2012 |
| JP | 2013002484 | A | 1/2013 |
| JP | 2013050242 | A | 3/2013 |
| JP | 2013088036 | A | 5/2013 |
| KR | 20020057547 | | 7/2002 |
| KR | 20020080938 | A | 10/2002 |
| KR | 20030083812 | A | 11/2003 |
| KR | 20040000126 | | 1/2004 |
| KR | 100620025 | B1 | 9/2006 |
| KR | 1020070044024 | A | 4/2007 |
| KR | 1020080103845 | | 11/2008 |
| KR | 20090026045 | | 3/2009 |
| KR | 1017776 | | 2/2011 |
| KR | 20120007241 | | 1/2012 |
| KR | 2012046621 | | 5/2012 |
| KR | 2012051305 | | 5/2012 |
| RU | 2077411 | C1 | 4/1997 |
| RU | 2132522 | C1 | 6/1999 |
| RU | 2252377 | | 5/2005 |
| RU | 2349618 | C2 | 3/2009 |
| RU | 2571031 | | 12/2015 |
| SU | 00476407 | A1 | 7/1975 |
| SU | 01307186 | A1 | 4/1987 |
| WO | 9849506 | | 11/1998 |
| WO | 0920964 | A1 | 4/1999 |
| WO | 9920964 | | 4/1999 |
| WO | 0160598 | | 8/2001 |
| WO | 0202987 | | 1/2002 |
| WO | 0252208 | | 4/2002 |
| WO | 02060576 | A1 | 8/2002 |
| WO | 03089729 | | 10/2003 |
| WO | 2006045694 | | 5/2006 |
| WO | 2007085511 | A1 | 8/2007 |
| WO | 2008122483 | A2 | 10/2008 |
| WO | 2009013106 | A2 | 1/2009 |
| WO | 2009112433 | A1 | 9/2009 |
| WO | 2009147106 | A1 | 12/2009 |
| WO | 2010007783 | A1 | 1/2010 |
| WO | 2010029730 | A1 | 3/2010 |
| WO | 2010043009 | A2 | 4/2010 |
| WO | 2010092627 | A1 | 8/2010 |
| WO | 2010127947 | A3 | 2/2011 |
| WO | 2011058678 | A1 | 5/2011 |
| WO | 2011003711 | A3 | 6/2011 |
| WO | 2011081498 | A3 | 11/2011 |
| WO | 2012023705 | A3 | 4/2012 |
| WO | 2012026715 | A3 | 6/2012 |
| WO | 2012043990 | A3 | 6/2012 |
| WO | 2012044001 | A3 | 6/2012 |
| WO | 2012119892 | A1 | 9/2012 |
| WO | 2012031885 | A3 | 1/2013 |
| WO | 2012085212 | A9 | 7/2013 |
| WO | 2014038150 | A1 | 3/2014 |
| WO | 2014095542 | | 6/2014 |
| WO | 2014184393 | A1 | 11/2014 |
| WO | 2016082907 | A1 | 6/2016 |

OTHER PUBLICATIONS

BASF, "Balindur™," web page, 2 pages, date unknown, http://product-finder.basf.com/group/corporate/product-finder/en/brand/BALINDUR.

PU Solutions Elastogram, "Balindur™ masters the challenge," web page, 2 pages, date unknown, http://product-finder.basf.com/group/corporate/product-finder/en/literature-document:/Brand+Balindur-Flyer—Balindur+The+new+VIP+fixation+technology-English.pdf.

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer—Balindur+The+new+VIP—fixation+technology-English.pdf, Dec. 21, 2014.

European Patent Application No. 13775196.2, Supplemental Search Report, dated Dec. 7, 2015, 10 pages.

European Patent Application No. 14158608.1, Search Report, dated Sep. 30, 2014, 5 pages.

International Patent Application No. PCT/US2013036203, International Search Report, dated Jul. 26, 2013, 10 pages.

European Patent Application No. 15154577.9, Search Report, dated Jul. 20, 2015, 8 pages.

European Patent Application No. 14158619, Search Report, dated Jun. 22, 2015, 9 pages.

European Patent Application No. 15153481, Search Report, dated Jul. 10, 2015, 6 pages.

KitchenAid, "Refrigerator user instructions," Sep. 5, 2015, 120 pages.

International Patent Application No. PCT/US2016/061125, International Search Report, dated Jan. 12, 2017, 9 pages.

International Search Report, Application No. PCT/US2016/020896, dated May 12, 2016. 3 pages.

European Search Report, Application No. EP14158615, dated Jun. 24, 2015, 5 pages.

International Searching Authority, "Search Report," issued in connection with International Patent Application No. PCT/US2016/062479, dated Feb. 9, 2017, 8 pages.

(56) References Cited

OTHER PUBLICATIONS

International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
International Search Report, International Application No. PCT/US2016/060519, dated Mar. 16, 2017, 10 pages.
International Search Report, International Application No. PCT/US2016/062804, dated Feb. 27, 2017, 9 pages.
International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.
International Search Report, International Application No. PCT/US2016/063958, dated Mar. 6, 2017, 10 pages.

* cited by examiner

ADHESIVELY SECURED VACUUM INSULATED PANELS FOR REFRIGERATORS

BACKGROUND OF THE INVENTION

Known refrigerator cabinets and doors may be constructed utilizing polyurethane insulation that is disposed between an outer wrapper and an inner liner. However, polyurethane foam has somewhat limited insulating properties. Various types of vacuum insulated panels for refrigerator cabinets and doors have been developed in an effort to decrease the wall thickness and/or increase the insulating properties of these structures. However, known insulated cabinet and door structures may suffer from various drawbacks.

SUMMARY OF THE INVENTION

A method of making a cabinet for refrigerators and the like includes forming a liner and a wrapper having a periphery. The method further includes providing a vacuum insulated core that includes a filler material disposed inside a substantially impermeable envelope. The envelope is evacuated to form a vacuum inside of the envelope. The vacuum insulated core is folded to form a 3D core having a first wall and a second wall extending transversely relative to the first wall along a fold line. The 3D core is adhesively secured to the wrapper, and the liner is adhesively secured to the 3D core. The wrapper and the liner are sealed together at the peripheries thereof.

These and other features, advantages, and objects of the present disclosure will be further understood and appreciated by those skilled in the art by reference to the following specification, claims, and appended drawings.

BRIEF DESCRIPTION OF THE DRAWINGS

FIG. 2;

DETAILED DESCRIPTION

Figure 1:
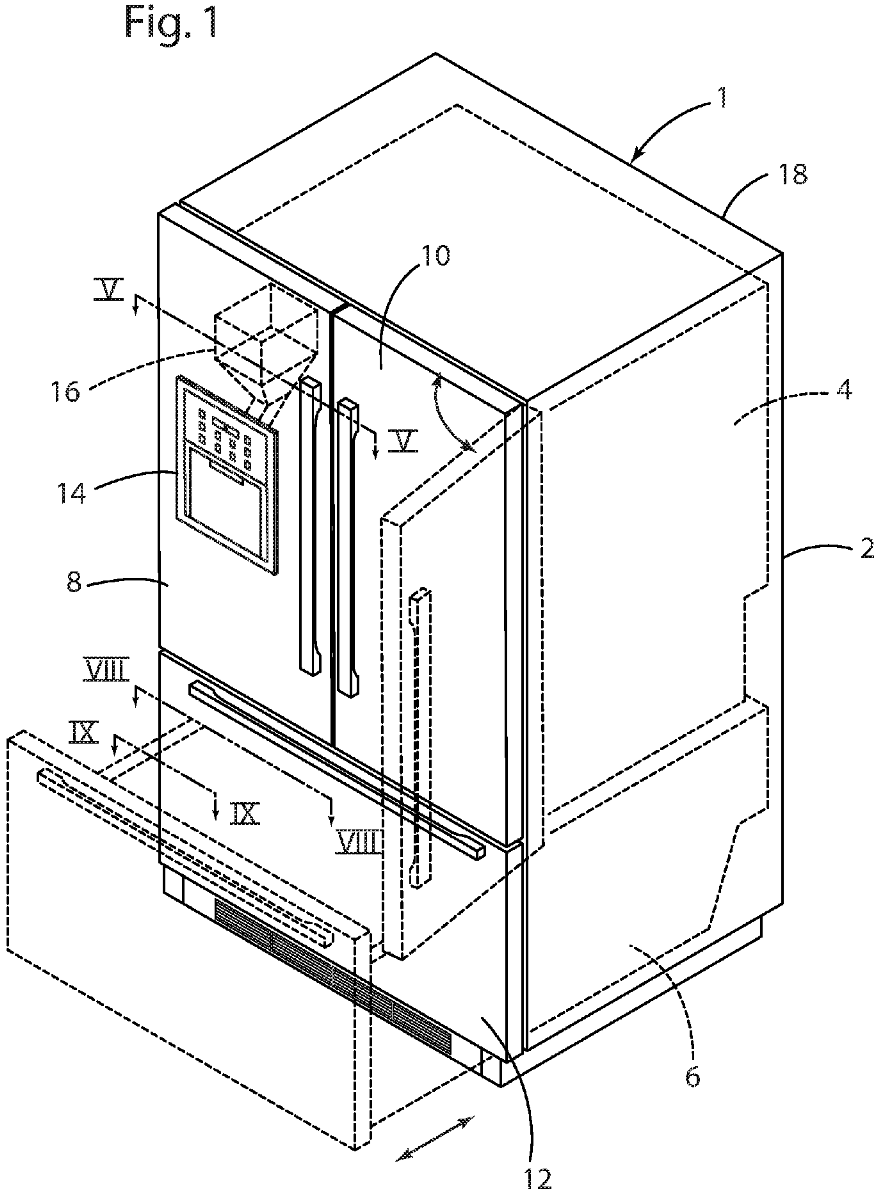
FIG. 1 is an isometric view of a refrigerator.

For purposes of description herein, the terms “upper,” “lower,” “right,” “left,” “rear,” “front,” “vertical,” “horizontal,” and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
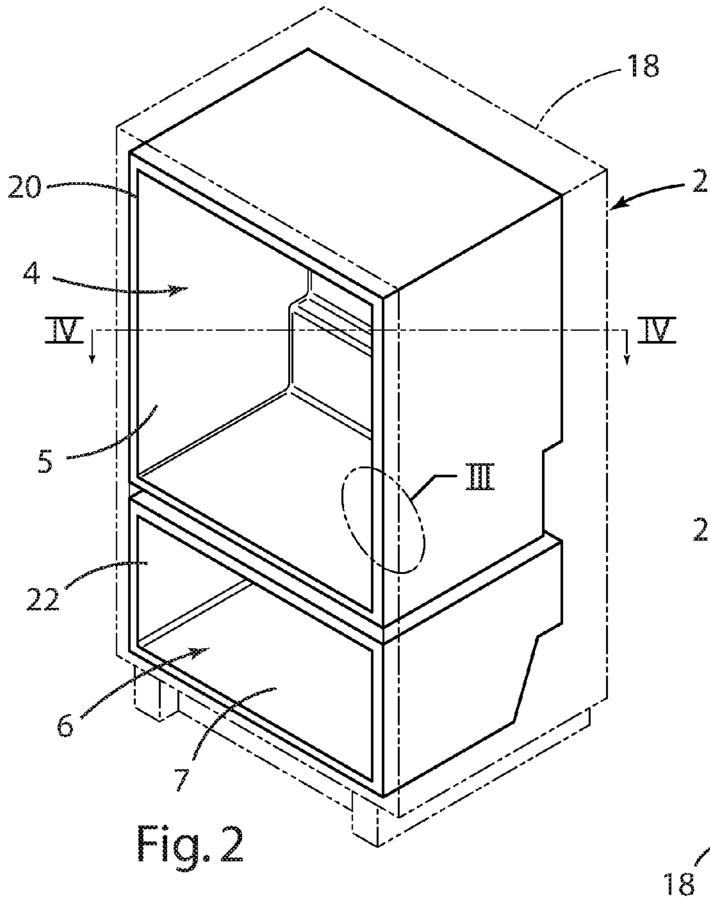
FIG. 2 is an isometric view of interior components of the refrigerator of FIG. 1.

With reference to FIGS. 1 and 2, a refrigerator 1 includes an insulated cabinet 2 having a fresh food compartment 4 and a frozen food compartment 6. The fresh food compartment 4 can be accessed through access opening 5 by opening doors 8 and 10, and the frozen food compartment 6 can be accessed through access opening 7 by sliding door/drawer 12. The refrigerator 1 may include an ice/water dispenser 14 mounted to door 8. The ice/water dispenser 14 may be connected to an ice box 16 formed in door 8.

As shown in FIG. 2, vacuum insulated cabinet 2 includes an external wrapper 18, and a first liner 20 that is disposed within wrapper 18. Liner 20 forms fresh food compartment 4. A second liner 22 is also disposed within external wrapper 18. The second liner 22 forms frozen food compartment 6. The first and second liners 20 and 22 may be constructed utilizing substantially similar materials and processes. The external wrapper 18 may comprise sheet metal, and the liners 20 and 22 may comprise polymer materials. However, the wrapper 18 and liners 20 and 22 may be fabricated from a variety of materials as may be required for a particular application.

Figure 3:
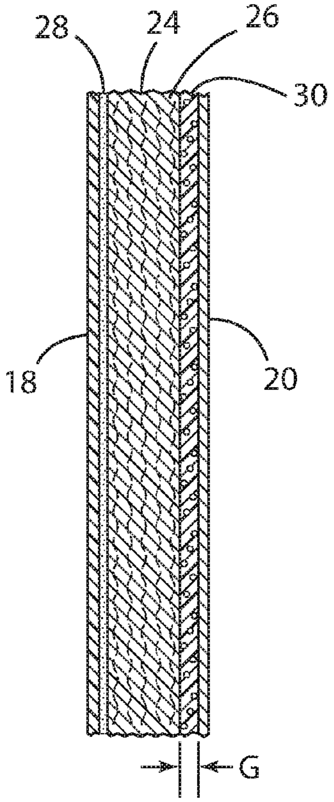
FIG. 3 is a fragmentary view of a portion of the refrigerator cabinet of FIG. 2.

With further reference to FIG. 3, cabinet 2 includes a vacuum core 24 that is disposed in a space 26 between wrapper 18 and liner 20. As discussed in more detail below, vacuum core 24 may be adhesively secured to wrapper 18 by a suitable adhesive such as hot melt adhesive or two-sided adhesive tape 28. A thin layer of adhesive 30 may be disposed in a gap “G” between vacuum core 24 and liner 20. As also discussed below, adhesive 30 preferably has a low viscosity prior to curing such that liquid adhesive 30 flows into and fills gap G prior to curing.

Figure 4:
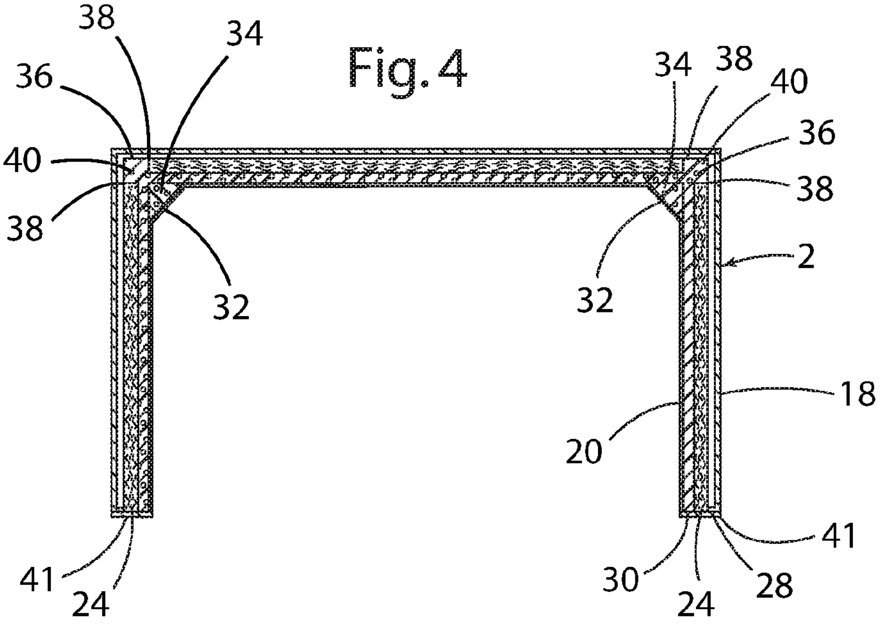
FIG. 4 is a cross sectional view taken along the line IV-IV.

With further reference to FIG. 4, liner 20 may include chamfered or radiused corners 32 forming vertically extending inner corner spaces 34 between the liner 20 and vacuum core 24. Vertically extending outer corner spaces 36 may be formed adjacent vertical spaces 34 adjacent edges 38 of vacuum core panels 24. The vertically extending spaces 34 and 36 may be filled with polyurethane foam 40 that is substantially similar to polyurethane foam used in prior refrigerator cabinets that are not vacuum insulated. As discussed in more detail below in connection with FIGS. 6 and 7, the vacuum core 24 may optionally comprise a 3D structure that is formed from a generally flat blank by folding or other suitable process. If core 24 comprises a folded structure without edges 38, vertical spaces 36 are not formed. If vacuum core 24 comprises a folded structure, the vertical spaces 34 may be smaller, or they may be eliminated as required for a particular application. Front edge 41 of cabinet 2 may comprise a separate insulated sealing member that interconnects wrapper 18 and liner 20. Alternatively, the edge 41 may comprise overlapping flanges or the like that interconnect wrapper 18 and liner 20.

Figure 5:
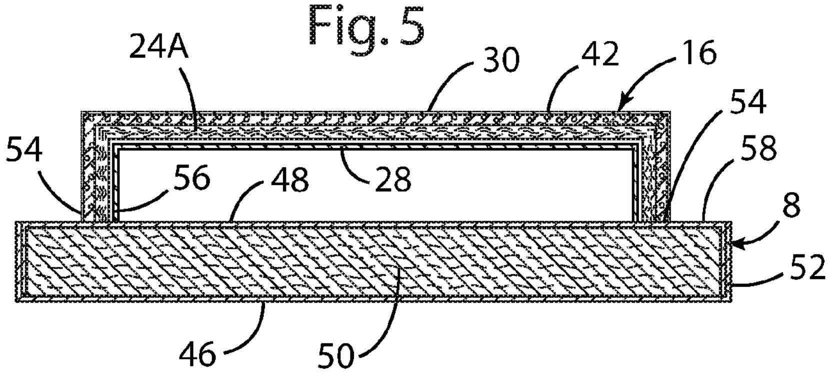
FIG. 5 is a cross sectional view of the refrigerator door of FIG. 1 taken along the line V-V.

With further reference to FIG. 5, door 8 may include a front portion or panel 52. The front panel 52 may comprise a vacuum insulated structure, or it may comprise a conventional refrigerator door structure having an outer door panel or wrapper 46, door liner 48, and polyurethane foam 50 disposed between the wrapper 46 and liner 48. Door 8 includes an ice box 16 having a vacuum core 24A that is disposed between first (outer) and second (inner) ice box components 42 and 44. The vacuum core 24A is adhesively secured to first component 42 by a relatively thin layer of adhesive 30, and vacuum core 24A is secured to second component 44 by two-sided adhesive tape 28, hot melt adhesive, or other thin adhesive. The ice box 16 and door front panel 52 may be fabricated separately, and the ice box 16 may be secured to inner surface 58 of front panel 52 utilizing interlocks (not shown) and/or adhesive.

Figure 6:
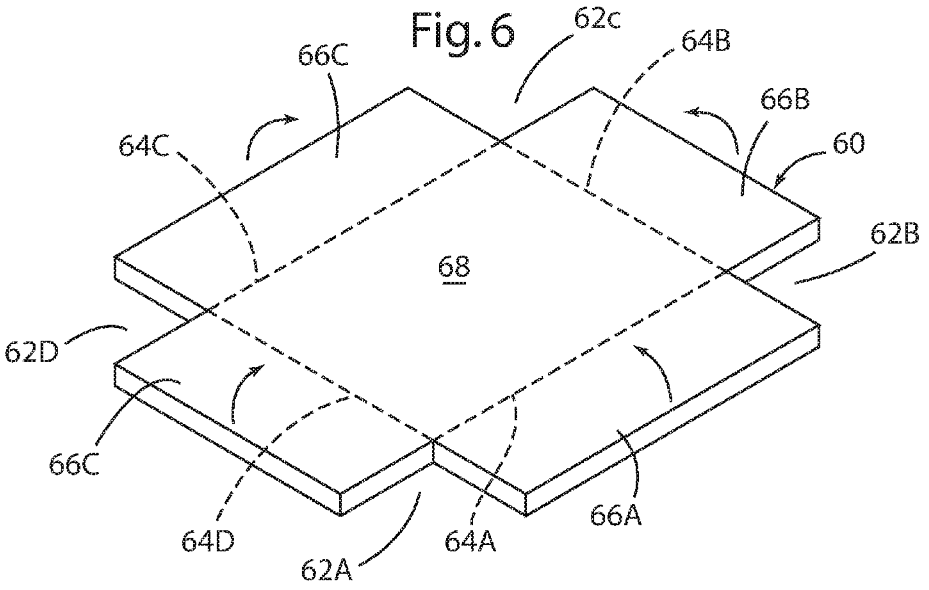
FIG. 6 is a partially schematic isometric view of a vacuum insulated core during fabrication thereof.
Figure 7:
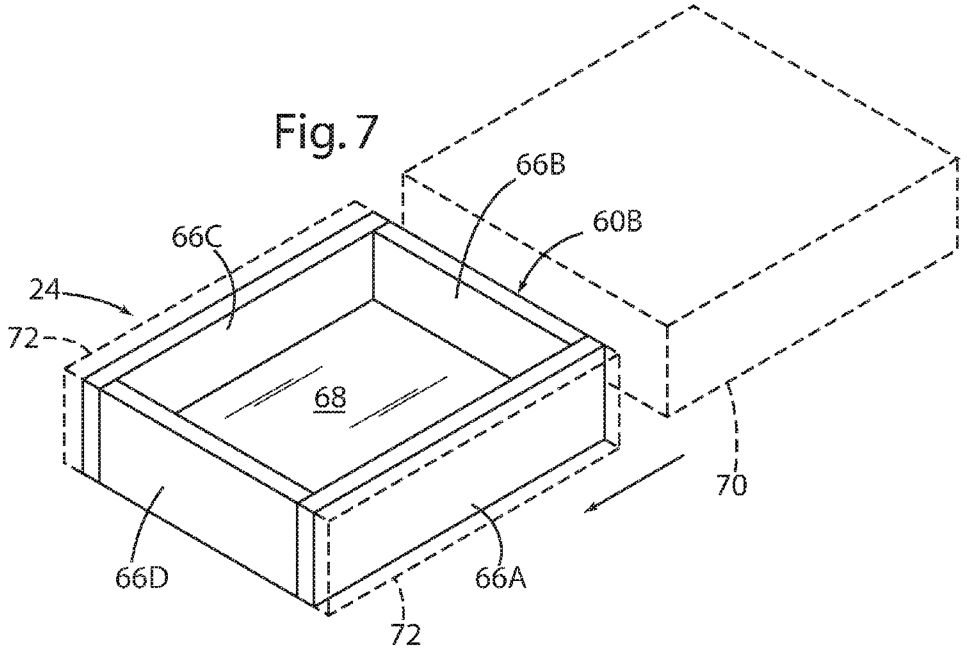
FIG. 7 is an isometric view of the vacuum insulated core of FIG. 6 after folding.

With further reference to FIGS. 6 and 7, the vacuum core 24 may be formed from a blank 60 of core material that may be cut to remove corner portions 62A-62D. The core material 60 may then be folded along fold lines 64A-64D whereby flaps 66A-66D are folded upwardly relative to central portion 68 of core material blank 60 to form a 3D box-like structure 60B as shown in FIG. 7. The core material blank 60 may comprise porous core material such as fiberglass or other suitable material. After the 3D structure 60B is formed, the 3D structure 60B is then placed within an envelope 70 that is made from a non-porous barrier film. The non-porous film may comprise one or more layers of polymer, metal foil, or other such materials known in the art. Envelope 70 is substantially impervious to gasses such as nitrogen, oxygen, water vapor, carbon dioxide and other gasses. The envelope 70 is then sealed and evacuated to form a vacuum. Alternatively, the core material blank 60 may be cut to remove corner portions 62A-62D and placed within an envelope 70 prior to folding. The edges of the envelope 70 are heat sealed and envelope 70 is then evacuated to form a Vacuum Insulated Panel (VIP). The VIP is then folded into the 5-sided box shape shown in FIG. 7. The sides and/or corners of the box may be taped in place to maintain the box shape.

Figure 10:
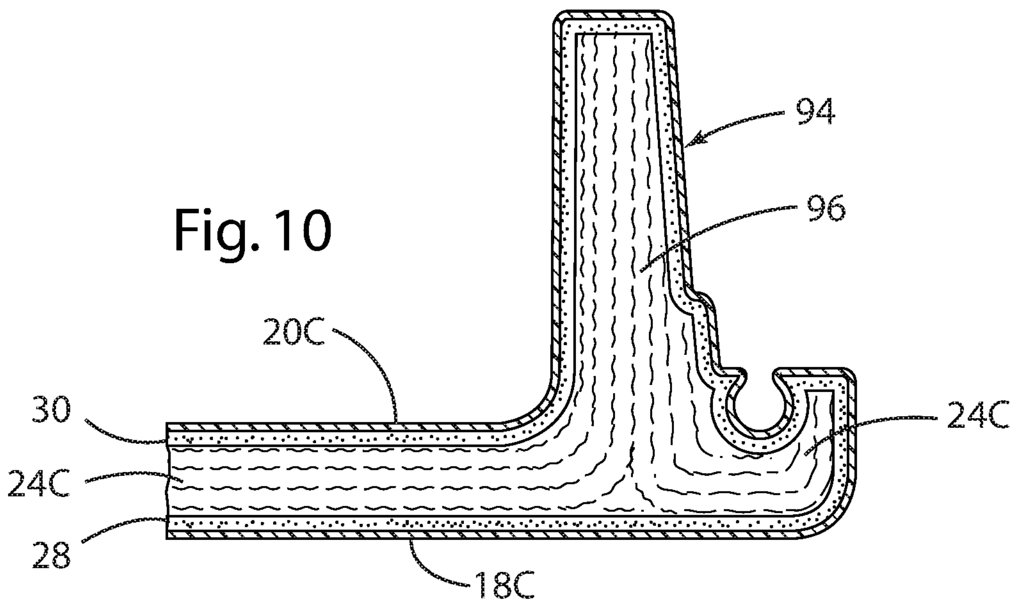
FIG. 10 is a partially fragmentary cross sectional view of a portion of a refrigerator.

As shown in FIG. 7, the vacuum core 24 may be generally box-shaped as required to fit between wrapper 18 and liner 20, or between components 42 and 44 of ice box 16, or between wrapper 46 and liner 48 of door 8. The vacuum insulated core 24 may have a variety of shapes and configurations as may be required to fit spaces formed between inner and outer components in a particular application. Also, additional pieces of core material 72 may be utilized to provide additional thickness in one or more areas of core 24. With reference to FIG. 10, the core 24 may also be made by adding additional pieces of core material or alternatively by forming the core material into a 3D shape that substantially matches the internal shape of the door (less allowance for the adhesive 30).

Figure 8:
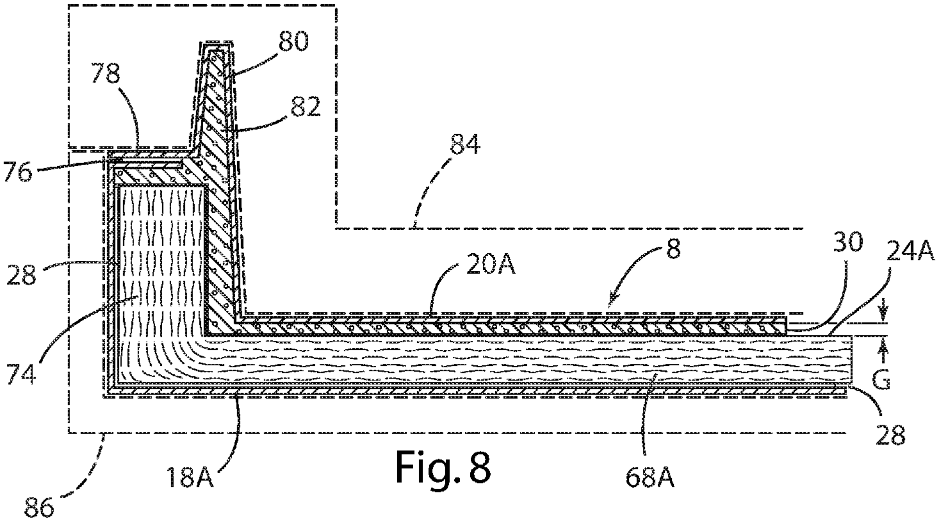
FIG. 8 is a partially fragmentary cross sectional view of a portion of a refrigerator.

With reference to FIG. 8, door 8 may include a 3D vacuum core 24A that is disposed between a wrapper 18A and liner 20A. The vacuum core 24A includes a generally planar central portion 68A and sidewalls 74. The sidewalls 74 have increased thickness that may be formed utilizing additional pieces of core material 72 (FIG. 7). During assembly, two-sided adhesive tape 28 or hot-melt adhesive is utilized to adhesively secure the vacuum core 24A to external wrapper 18. Adhesive 30 is then utilized to secure liner 20A to vacuum core 24A. Wrapper 18 may include a flange 76 that overlaps a flange 78 of liner 20A. The flanges 76 and 78 may be attached/sealed utilizing adhesives and/or mechanical fasteners (not shown) or other suitable arrangement. Flanges 76 and 78 may also be held in place by adhesive 30 such that additional adhesives and/or mechanical fasteners are not required to separately interconnect flanges 76 and 78. The liner 20A may include an inwardly-projecting portion 80 having an internal space 82 that may be filled with adhesive 30.

The vacuum core 24A may be configured to fit closely against wrapper 18A, such that very thin two-sided adhesive tape 28, hot melt adhesive, or other suitable adhesive may be utilized to secure the vacuum core 24A to the wrapper 18A. Due to variations in the dimensions of the wrapper 18A, liner 20A, and vacuum core 24A, a gap "G" is necessary between liner 20A and vacuum core 24A to account for the dimensional variations. In a preferred embodiment, the gap G is nominally about 5 mm to accommodate variations in the thickness of core 24A of about +/−2 mm, and variations in the dimensions of wrapper 18A and/or liner 20A.

The adhesive 30 may comprise a two-part polyurethane adhesive having low viscosity prior to curing. As discussed above, the vacuum core 24A may be adhesively secured to external wrapper 18A utilizing two-sided adhesive tape or other thin layer of adhesive. The adhesive 30 can then be poured over vacuum core 24A in an "open pour" process. Liner 20A can then be positioned over the vacuum core 24A, and upper and lower tool components or fixtures 84 and 86 may be utilized to hold the wrapper 18A and liner 20A in position relative to one another while adhesive 30 cures. As wrapper 18A and liner 20A are pressed together, uncured liquid adhesive flows within and fills gap G. Peripheral flanges 76 and 78 of wrapper 18A and liner 20A may also be adhesively or mechanically interconnected utilizing suitable known processes. Alternatively, adhesive 30 may be used to bond flanges 76 and 78 together. After the adhesive 30 cures, the assembled door 8 may be removed from the tools 84 and 86.

Alternatively, rather than an open pour process, after vacuum core 24A is adhesively secured to wrapper 18A, the liner 20A may be positioned over the vacuum core 24A and wrapper 18A prior to introduction of adhesive 30. The adhesive 30 may then be injected into the gap "G" between vacuum core 24A and liner 20A, and tools or fixtures 84 and 86 may be utilized to retain the wrapper 18A and liner 20A in position relative to one another during curing of adhesive 30. After the adhesive 30 cures, the assembled door 8 may be removed from the tools 84 and 86.

The adhesive 30 preferably comprises a relatively low viscosity adhesive that is capable of flowing into the gap "G" (FIGS. 3 and 8) between the liner and the vacuum core panel prior to curing. The adhesive may comprise a two-part polyurethane. The adhesive 30 is preferably significantly lower viscosity than conventional polyurethane foam, and has superior adhesive properties. An example of a suitable adhesive 30 is a Balindur™ polyurethane foam/adhesive available from BASF of Ludwigschafen, Germany. Also, although a two sided adhesive tape 28 (FIG. 3) or hot melt adhesive or other very thin adhesive is preferably used to adhesively bond the wrapper 18 to the core 24, a thin layer of adhesive 30 may also be utilized to bond wrapper 18 to the vacuum core 24.

Figure 9:
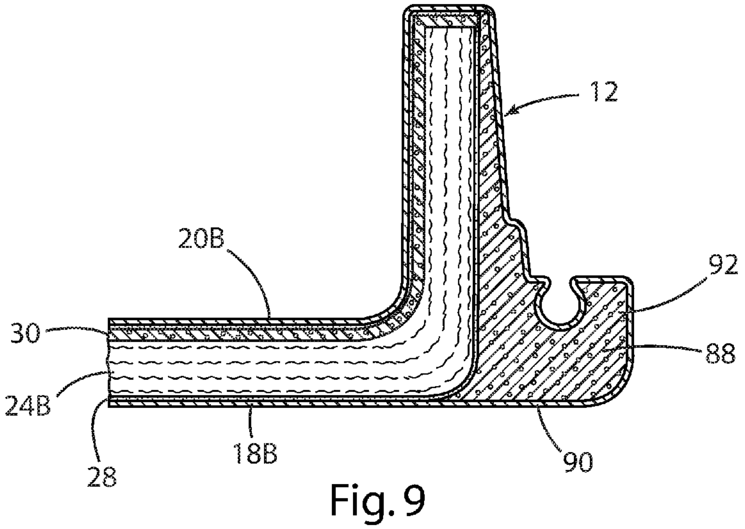
FIG. 9 is a partially fragmentary cross sectional view of a portion of a refrigerator.

With reference to FIG. 9, door/drawer 12 may include an external wrapper 18B, liner 20B, and vacuum core 24B. The drawer 12 may be fabricated in substantially the same manner as the door 8 as described above in connection with FIG. 8, except that drawer 12 includes an internal space 88 formed by an outer portion 90 of wrapper 18B. The internal space 88 may be filled with polyurethane foam 92. The polyurethane foam 92 may comprise polyurethane foam of the type utilized to insulate conventional (i.e. non vacuum-insulated) refrigerator cabinets and the like. The wrapper 18B may be secured to core 24B by two-sided adhesive tape 28, hot melt adhesive, or other suitable thin adhesive. The liner 20B is secured to the vacuum core 24B by adhesive 30 utilizing one of the processes discussed above in connection with FIG. 8.

With further reference to FIG. 10, a drawer or door 94 includes a wrapper 18C, liner 20C, and a vacuum core 24C disposed therebetween. The external wrapper 18C is secured to the vacuum core 24C by two sided adhesive tape 28 or other suitable adhesive, and the liner 20C is secured to the vacuum core 24C by thin adhesive 30. The drawer or door 24 may be fabricated utilizing an open pour process, or a closed process as discussed in more detail above in connection with FIG. 8. The vacuum core 24C may have additional thickness in various regions 96 as may be required to fill the space defined between wrapper 18C and liner 20C.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of making a vacuum insulated refrigerator component, the method comprising:

forming a wrapper having inner and outer opposite sides, a periphery, wherein the wrapper includes a central wall portion and edge walls that extend transversely from the central wall portion to form a core-receiving space;

forming a liner having inner and outer opposite sides and a periphery;

providing a vacuum insulated core comprising a filler material disposed inside a substantially impermeable envelope, wherein the envelope is evacuated to form a vacuum inside the envelope, and wherein the vacuum insulated core comprises a three-dimensional (3D) core having a first wall, and a second wall extending transversely relative to the first wall;

depositing uncured two-component adhesive onto the vacuum insulated 3D core before the wrapper and the liner are assembled;

assembling the wrapper and the liner to form an interior space, wherein the vacuum insulated 3D core is disposed in the interior space;

interconnecting the wrapper and liner;

curing the adhesive;

wherein the vacuum insulated 3D core is positioned in the core-receiving space of the wrapper and a lower side of the vacuum insulated 3D core is adhered to the wrapper utilizing double-sided adhesive tape or hot melt adhesive and then depositing the uncured two-component adhesive onto an upper side of the vacuum insulated 3D core; and adhesively securing the vacuum insulated 3D core to the liner by causing the uncured two-component adhesive to flow between the vacuum insulated 3D core and the liner.

2. The method of claim 1, including:

positioning the wrapper and the liner between first and second tool parts with the vacuum insulated 3D core disposed between the wrapper and the liner.

3. The method of claim 1, wherein:

the uncured two-component adhesive is deposited utilizing an open pour process.

4. The method of claim 1, wherein:

the two-component adhesive comprises a polyurethane that forms a foam when cured.

5. The method of claim 1, wherein:

a portion of the liner is spaced apart from the vacuum insulated 3D core to form a liner gap of about 5 mm.

6. The method of claim 1, wherein:

the vacuum insulated 3D core is initially a flat panel; and including:

folding the flat panel along one or more fold lines to form the first wall and the second wall, wherein the flat panel is folded after the envelope is evacuated to form a vacuum.

7. The method of claim 1, wherein:

the wrapper, liner, and vacuum insulated 3D core form a refrigerator cabinet having an interior space configured to store refrigerated food therein and an access opening; and including:

movably mounting a door to the refrigerator cabinet whereby the door selectively closes off at least a portion of the access opening.

8. The method of claim 1, including:

interconnecting the peripheries of the wrapper and the liner.

9. The method of claim 1, wherein:

the adhesive cures after the wrapper, liner, and 3d core are assembled.

* * * * *